US010682775B2

(12) United States Patent
Arethuse (10) Patent No.: US 10,682,775 B2
(45) Date of Patent: Jun. 16, 2020

(54) BIDIRECTIONAL DEVICE FOR CHANGING A HANDLING GLOVE AND METHOD FOR REPLACING SAID GLOVE BY TRANSLATION

(71) Applicant: Piercan, Port en Bessin (FR)

(72) Inventor: Franck Arethuse, Le Mans (FR)

(73) Assignee: PIERCAN, Port en Bessin (FR)

( * ) Notice: Subject to any disclaimer, the term of this patent is extended or adjusted under 35 U.S.C. 154(b) by 289 days.

(21) Appl. No.: 15/560,350

(22) PCT Filed: Mar. 23, 2016

(86) PCT No.: PCT/EP2016/056446
§ 371 (c)(1),
(2) Date: Sep. 21, 2017

(87) PCT Pub. No.: WO2016/151045
PCT Pub. Date: Sep. 29, 2016

(65) Prior Publication Data
US 2018/0071926 A1    Mar. 15, 2018

(30) Foreign Application Priority Data
Mar. 26, 2015 (FR) ...................... 15 52557

(51) Int. Cl.
*B25J 21/02* (2006.01)
*A41D 19/00* (2006.01)
(Continued)

(52) U.S. Cl.
CPC .......... *B25J 21/02* (2013.01); *A41D 13/0005* (2013.01); *A41D 19/00* (2013.01);
(Continued)

(58) Field of Classification Search
CPC .......... B25J 21/00; B25J 21/02; A41D 13/00; A41D 13/0002; A41D 13/0005;
(Continued)

(56) References Cited

U.S. PATENT DOCUMENTS 4,010,588 A * 3/1977 Eisert .................. B25J 21/02
52/204.593
4,069,913 A * 1/1978 Harrigan ............. A61B 42/50
128/856

(Continued)

FOREIGN PATENT DOCUMENTS

| EP | 1 967 335 A1 | 9/2008 |
| FR | 2 409 828 A1 | 6/1979 |
| FR | 2 913 362 A1 | 9/2008 |
| WO | 2015135895 A1 * | 9/2015 |

OTHER PUBLICATIONS

Search Report issued in French Patent Application No. 15 52557 dated Feb. 18, 2016.
(Continued)

*Primary Examiner* — Ismael Izaguirre
(74) *Attorney, Agent, or Firm* — Pearne & Gordon LLP (57) ABSTRACT

The invention relates to a bidirectional device for changing a handling glove from the inside towards the outside and from the outside towards the inside of a glove box under containment. The device is intended for replacing a used glove (60) with a new glove. The device comprises a cuff (6) sealingly connected to a cuff sleeve (20) and a glove (60) made of a flexible material sealingly connected to a glove sleeve (40). The glove sleeve comprises snap-fitting studs on the outside and the cuff sleeve comprises axial ramps (30). The snap-fitting studs of the glove sleeve slide in the axial ramps of the cuff sleeve until the glove sleeve is locked, forming, once assembled, a sealed assembly referred to as cuff port (10).

13 Claims, 8 Drawing Sheets

(51) Int. Cl.
*G21F 7/04* (2006.01)
*A41D 13/00* (2006.01)
*G21F 7/047* (2006.01)
*G21F 7/053* (2006.01)

(52) U.S. Cl.
CPC ........... *A41D 19/0089* (2013.01); *G21F 7/04* (2013.01); *G21F 7/047* (2013.01); *G21F 7/053* (2013.01)

(58) Field of Classification Search
CPC ................ A41D 19/00; A41D 19/0089; A41D 19/0034; A41D 19/0041; A41D 19/0044; A41D 19/0048; G21F 7/047; G21F 7/04; G21F 7/053; A47G 25/904
See application file for complete search history.

(56) References Cited

U.S. PATENT DOCUMENTS

| | | | |
|---|---|---|---|
| 4,141,609 A | 2/1979 | Eisert | |
| 5,090,782 A * | 2/1992 | Glachet | G21F 7/053 312/1 |
| 8,887,365 B2 * | 11/2014 | Giesen | B25J 21/02 29/401.1 |
| 2002/0189007 A1 * | 12/2002 | Cormier | A41D 19/0089 2/457 |
| 2008/0217366 A1 | 9/2008 | Rohard | |

OTHER PUBLICATIONS

International Search Report issued in Application No. PCT/EP2016/056446 dated Jun. 17, 2016.
Written Opinion issued in Application No. PCT/EP2016/056446 dated Jun. 17, 2016.

* cited by examiner

BIDIRECTIONAL DEVICE FOR CHANGING A HANDLING GLOVE AND METHOD FOR REPLACING SAID GLOVE BY TRANSLATION

This invention relates to the interchangeability of handling gloves with or without a rolled edge, with continuity of sealed confinement in the following industrial fields: pharmacy, animal keeping, chemicals, etc. More precisely, the invention relates to a device for changing a handling glove bidirectionally from the inside of a glove box to the outside or from the outside of the glove box to the inside, also called a confinement containment or isolator. Said device being designed to replace a used glove by a new glove, comprising a cuff with a sealed connection to a cuff sleeve and a glove made of a flexible material with a sealed connection to a glove sleeve. The assembly thus formed is also called a cuff port.

The invention also relates to a method for replacing a used glove by a new glove using the device according to this invention.

Highly volatile toxic products and chemicals are routinely handled in confined environments. Confined environments are also used to protect elements from external pollution when handling is required in a sterile medium, for example in the case of the pharmaceutical industry for packaging of injectable medicines, raising laboratory animals under aseptic conditions, anti-cancer products handled in hospital pharmacies, food processing, etc.

These confined environments comprise a sealed containment. The containment is fitted with openings in which gloves are fixed, so that manipulations can be done from outside the containment. Thus, a person introducing a hand into a glove can manipulate objects contained inside the containment without a risk of polluting them and without a risk of being contaminated.

These gloves can be fitted on the containment in different ways, for example by glove rings fixed to the containment, called shoulder ports for gloves fixed by a collar or containment ring for gloves fitted on interchangeable support ring using a ejection mechanism called an ejection gun, replacing the used glove ring by pushing it out with a new glove ring.

Shoulder ports are used equally well for cells with negative pressure and for cells with positive pressure. Shoulder ports surround the operator's hand and arm, up to the shoulder.

Ejectable ring systems are only used at the present time for cells under negative pressure because the ejection mechanism is large and its high volume and heavy weight make it impossible to use it inside the confinement.

In particular in the animal raising and pharmaceutical environments in sterile confinement, the glove made in a single length is split into two elements, namely a high relatively strong part called a cuff. The cuff is connected at the containment to a shoulder port that can be circular or oval and is large to allow more clearance for the operator. Furthermore, the glove is separated into a lower part that is connected to a sleeve at the wrist and is used to fit a glove appropriate for each manipulation. This glove can be replaced by a new glove from inside the confinement using the other hand. However, the replacement procedure is very difficult. This method is acceptable in a research laboratory but certainly not in an industrial environment or in hospital pharmacies.

Document FR 2 913 362 describes a method of replacing a glove previously installed on a glove ring that fits into the cuff ring fixed at its end.

Interchangeability of the used glove is obtained by passing a sterile new glove inside the confinement. This glove is fitted in a tool called the "support". A second tool called the "pusher" is fitted inside the cuff. The glove is engaged on the cuff ring on the inside of the isolator, the support containing the new glove fixed on its ring is brought into place to engage it on the used glove ring. The cuff ring is slid into place from the used glove ring onto the new glove ring by pushing the pusher in reaction from the support.

This method requires dexterity on the part of the operator and remains complex.

The special tools, the pusher and the support, one of which holds the used glove in a cavity and the other holds the new glove in a cavity with no risk of trapping, are thus tools with a non-negligible size inside the cell, particularly for the pusher.

The adopted principle for glove rings to enable interchangeability uses two stages. Each ring is composed of a first sleeve for which the inside diameter fits inside the cuff ring and a second sleeve with a diameter smaller than the diameter of the first sleeve so that the glove and its attachment can be fitted by a collar with two diametrically opposite heads. The diameter of the heads must be less than the inside diameter of the first sleeve so that one can penetrate into the other as necessary for the adopted interchangeability principle.

The major disadvantages of this principle are a reduction in the dexterity of the operator because the glove ring composed of two sleeves is thickened and because of the increase in length due to their superposition. The consequence of this state of affairs is to increase the weight and the size of the glove at the operator's wrist, which correspondingly reduces his dexterity and increases his fatigue.

The axial stop of the glove ring in the cuff ring is obtained by the use of hard points. In the case of the sealing means described above, the interchangeability force becomes continuous and therefore the operator loses the feel of the click-fit means used as end of attachment indicators as they pass through the hard points. Subsequently, the operator is not sure that he has finished transferring the glove onto the cuff ring. There is a risk that he might withdraw the pusher with the used glove before the new glove has been placed on the ring.

There are also the following secondary disadvantages of this principle:
  placement of the first glove requires a mask or a special tool;
  the tapered lid requires a longer movement distance of the piston from the support by a value equal to the height of the lid, which has the effect of increasing the size and weight of the tools;
  the orientation of the glove can be wrong. The glove can be placed with the thumb at the top which is the correct position, or with the thumb at the bottom which is an incorrect position. There is no foolproof device to be certain that that the thumb is in the right position at the top.

Consequently, the purpose of this invention is to disclose a device to replace the glove on the cuff that overcomes the disadvantages listed above and that gives greater safety and ease of operation for operators in the confinement.

PRESENTATION OF THE INVENTION

A first purpose of the invention is a device to replace a handling glove from the inside to the outside of a glove box and from the outside to the inside under confinement, said device being designed to replace a used glove by a new glove comprising a cuff connected in a sealed manner to a shoulder port mounted in a sealed manner on the wall of a confinement containment connected in a sealed manner to a cuff sleeve, and a glove made of a flexible material connected in a sealed manner to a glove sleeve.

According to the invention, the outside of the glove sleeve comprises a determining number of snap-fitting studs on the flexible sectors, and the cuff sleeve that has a cylindrical internal surface without any obstacles, comprises the same number of axial ramps on the inside to guide the snap-fitting studs into the anchor cavities, locking the glove sleeve in the cuff sleeve, forming a fully sealed assembly called a cuff port once assembled.

The snap-fitting studs on the glove sleeve engage in the axial grooves of the cuff sleeve. The tabs fitted on the flexible sectors clip into small cavities locking the glove sleeve in the cuff sleeve, so that the sealed assembly forms an indissociable cuff port.

No tools are necessary to replace the glove.

Interchangeability by a new glove is achieved by introducing the studs on the glove sleeve body into the peripheral entries of the axial grooves of the cuff sleeve and synchronously, retraction pins retract the studs from the glove sleeve to be replaced, releasing them from the cuff sleeve by means of a thrust in the direction of translation. The new glove sleeve clips into place and is locked on the cuff sleeve, while releasing the old glove sleeve.

A static and dynamic seal during the replacement is advantageously composed of at least one seal with one or two lips, either injected or embedded in a sealed manner in the groove of the glove sleeve provided on the glove sleeve body to give a permanent seal between the cuff sleeve and the glove sleeve.

This seal is maintained at all times when the glove seal is being replaced.

Slip of the elastomer of the seal between the cuff ring and the glove ring is improved by surface ionisation that has the advantage of hardening the elastomer only on the surface and reducing the coefficient of friction, increasing its durability and its resistance to sterilisation products. Bombardment of the elastomer during surface ionisation with Silver ions makes the surface active to neutralise bacteria, which has two very important advantages: slip and antibacterial action, the combined translation/rotation movement of the glove sleeve in contact with the internal wall of the cuff sleeve body therefore takes place effortlessly and reinforces the integrity of replacement of the glove by its antibacterial action.

Preferably, the device to replace the glove comprises a seal with one or two elastomer lips on which surface ionisation has been done to improve its slip properties, facilitating placement of a new ring and ejection of the old ring.

It comprises snap-fitting studs (49) and stud retraction pins (47) provided with a visual and mechanical foolproofing system, such that the glove will always be put in the right working position.

The glove replacement device does not require any special tool for the interchangeability manipulation by the operator, visual marks are used to facilitate positioning during interchangeability actions consisting of a simple translation.

Preferably, the glove replacement device comprises a locking system composed of snap-fitting studs inserted into appropriate cavities. These snap-fitting studs can only be unclipped after the retraction pins have entered the housings in the flexible sectors to retract inwards into the glove sleeve, this action unclipping these snap-fitting studs.

Preferably, the glove replacement device comprises a glove sleeve composed of a glove sleeve body comprising devices to guide and lock this glove sleeve body in the cuff sleeve body. It comprises a ring for assembly of the glove in the glove sleeve body, the support being achieved by the glove assembly ring in the glove sleeve body.

The seal between the glove sleeve body and the glove assembly ring is achieved by pressing the elastomer of the glove.

Preferably, the device to replace the glove is composed of the cuff sleeve body and a cuff assembly ring. The assembly ring presses the cuff against the stop on the cuff sleeve body, this sealing the cuff sleeve, and the complete assembly is held in place by a mechanical assembly making them indissociable.

Another main purpose of the invention is a method of replacing a used glove by a new glove using a device like that described above.

It comprises the following phases:
a new glove fitted with its glove sleeve is placed inside the confinement containment;
the two cuff sleeve assembly and glove assembly rings are fixed together by force fitting them one into the other;
the new glove sleeve is pushed into the used glove sleeve on the cuff sleeve until the new sleeve locks in the axial ramps in the cuff sleeve body until the visual mark is reached and a locking "click" is heard and the used glove sleeve is completely disengaged from inside the cuff.

At least three female notches are formed on the edge of the used glove sleeve body into which three male notches fit to pull the new glove sleeve into the correct position, namely with the thumb upwards. Three housings are also provided in the flexible sectors into which the pins of the new glove sleeve fit to unclip the studs of the used glove sleeve.

Interchangeability does not require any tools in the case of a work station with two gloves. It is sufficient to hold the new glove sleeve with the other hand through the glove, to place it on the cuff port respecting the marks made on the cuff and glove sleeves, engage the studs in the axial grooves holding the faces of the glove sleeves in contact with each other and pushing. The used glove sleeve moves out as the translation continues, the new glove sleeve clips into place and the used glove sleeve drops inside the cuff.

Preferably, the end of cycle safety system locks the new glove sleeve in rotation relative to the cuff sleeve, and consists of studs snap-fitting into cavities provided for this purpose, preventing any radial or axial movement. The operator is assured that the glove sleeve is correctly locked by hearing a "click" sound and by a visual positioning indicator. These two signals prove that the glove is well locked and is in the right position.

Advantageously, the elastomer seal contains a decontaminant that neutralises any bacteria originating from inside the cuff, advantageously the configuration of the seal will make the connection leak tight.

According to the method of replacing a used glove sleeve by a new glove using a device according to the invention:
if the system is used under negative pressure, the cuff is rolled up towards the outside of the cell, while if the system is used under positive pressure, the used glove is rolled up towards the outside of the cuff;
if the system is used under negative pressure, the new glove is rolled up towards the inside of its own sleeve;

a new glove fitted with its glove sleeve is placed inside the confinement cell (isolator) in the case of positive pressure and outside in the case of negative pressure;

in both cases (positive and negative pressure), the new glove sleeve is placed on the used glove sleeve in position in the cuff sleeve body. The slopes at the entry to the housings enable precentring of the pins;

the new glove sleeve is pushed into place on the old glove sleeve, which has the effect of engaging the male notches in the female notches of the old glove sleeve and in the same movement, engaging the retraction pins in the housings of the old glove sleeve. This has the effect of retracting the snap-fitting studs towards the inside of the previous glove sleeve;

the block of the two glove sleeves is pushed in translation into the cuff sleeve body, thus locking the new glove sleeve into the cuff sleeve body under the effect of the snap-fitting studs in the axial ramps in the cuff sleeve body, aligned with the end of locking mark located on the cuff sleeve body, signalled by a "click".

The used glove sleeve is pushed clear into the inside of the cuff for a system used under positive pressure. The used glove sleeve is pushed clear into the inside of the glove box for a system used under negative pressure.

BRIEF DESCRIPTION OF THE DRAWINGS

Other characteristics and advantages of this invention will become clear after reading the description given below of an example embodiment given for illustrative purposes with reference to the appended figures. On these figures.

DETAILED DESCRIPTION OF THE INVENTION

Marks followed by the letter "a" refer to parts installed for operation in positive pressure. Marks followed by the letter "b" refer to parts installed for operation in negative pressure.

The same parts can be used for an assembly for cells in positive pressure and for cells in negative pressure, simply by inverting the cuff sleeve body 21a (installation in positive pressure) or 21b (installation in negative pressure) and the glove sleeve body 40a, 40b. For assembly of a cell in negative pressure, the glove 60b is rolled up on its assembly ring 42a and 42b.

Figure 1:
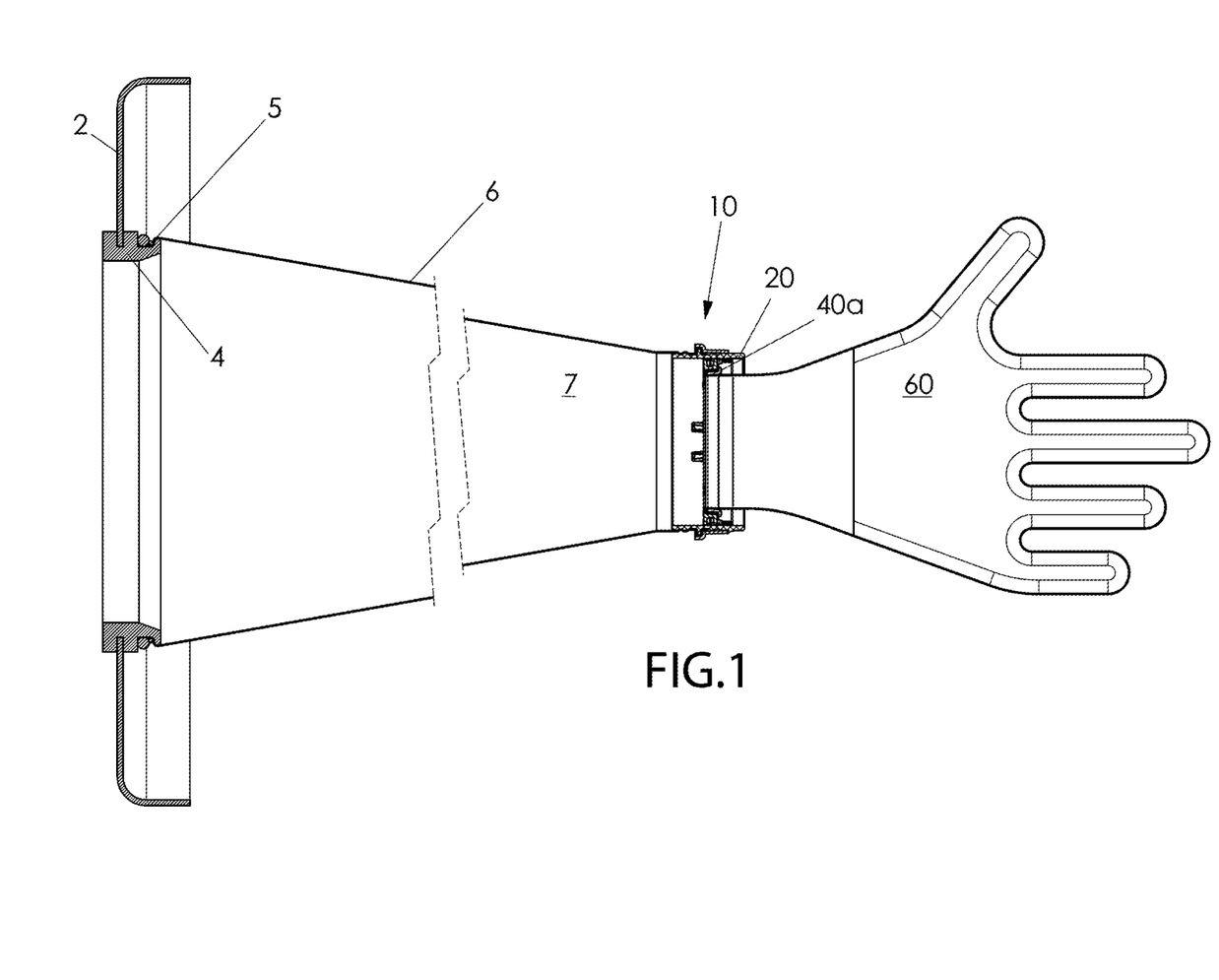
FIG. 1 is a view of a glove box comprising a handling glove replacement device according to this invention.

FIG. 1 shows a device for replacing a handling glove in positive pressure. This device is fixed on a shoulder port 4 installed in a sealed manner on a wall 2 of a confinement containment in this case, the cuff 6 is fixed on the shoulder port by a collar 5. The cuff 6 can be fixed onto the shoulder port by any other appropriate method, for example by anchoring into a cavity by injection of silicone, by trapping the skin of the cuff 6 by a glued intermediate part, by gluing or by welding depending on the materials present. At its end opposite to the end fixed on the glove ring, the cuff 6 is fixed to a cuff sleeve 20 inside which a glove sleeve 40a is installed. A glove 60a is fixed to the glove sleeve 40a. The assembly compose of the cuff sleeve 20 and the glove sleeve 40a is called the cuff port 10.

The glove 60a is installed on the glove sleeve 40a by any appropriate method, and in particular it can be installed by anchoring and trapping using an assembly ring in the glove sleeve.

The internal volume of the cuff 7 corresponds to the atmosphere outside the glove box.

Figure 2:
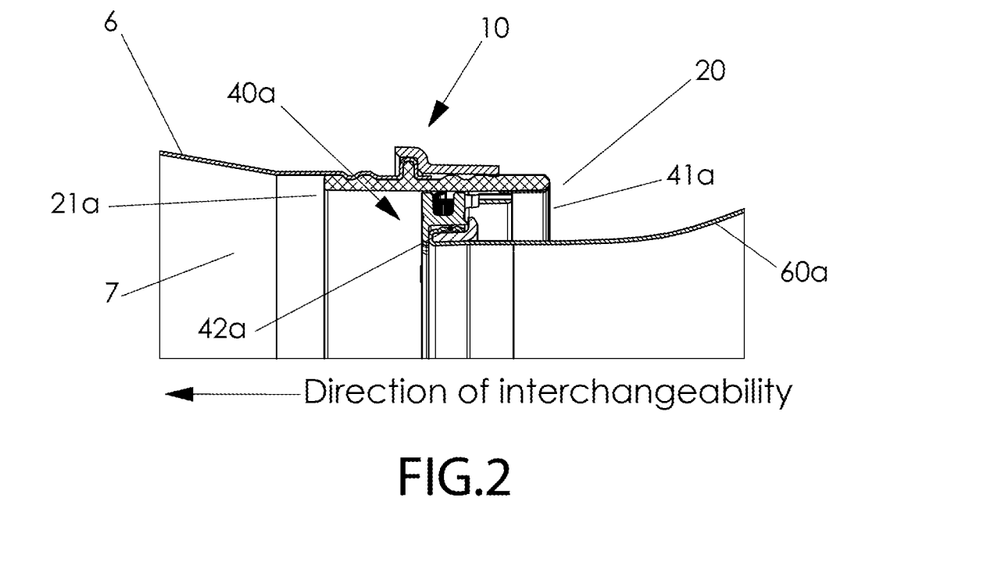
FIG. 2 shows the cuff port assembly for use in a glove box in positive pressure.

FIG. 2 shows the assembly of the cuff port that enables interchangeability from inside to outside using the same parts, applicable for use in a glove box under positive pressure, used particularly for pharmaceutical applications.

Figure 3:
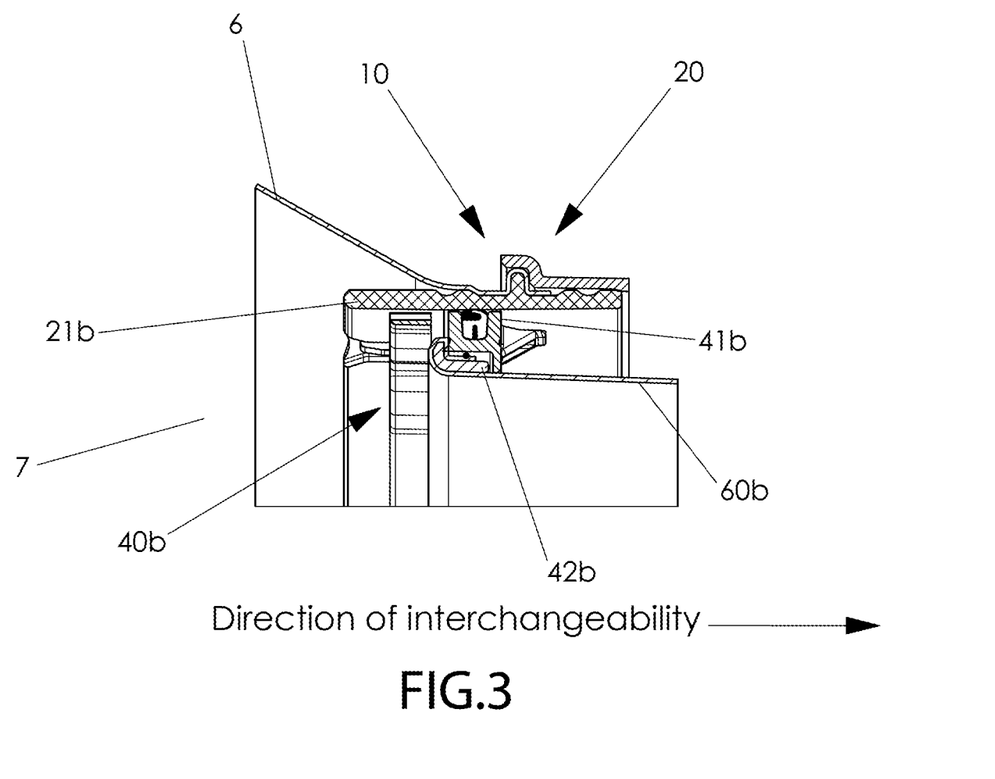
FIG. 3 shows the cuff port assembly for use in a glove box in negative pressure; It will be seen that this can be achieved by inverting the cuff sleeve body and the glove sleeve in which the glove is assembled from the outside towards the inside of the glove box.

FIG. 3 shows the assembly of the cuff port that enables interchangeability using these same parts with no special tools, from outside to inside, applicable for use in a glove box under negative pressure. The cuff sleeve body 21 is inverted, the cuff 6 is fixed in exactly the same way as in FIG. 2. The glove sleeve 40b is presented inside the cuff which means that the glove 60b has to be installed by inverting it on its assembly ring 42b.

The case of a cell in positive pressure (sterile) is considered in the following. Therefore the glove is replaced from the inside of the containment towards the outside.

Figure 4A:
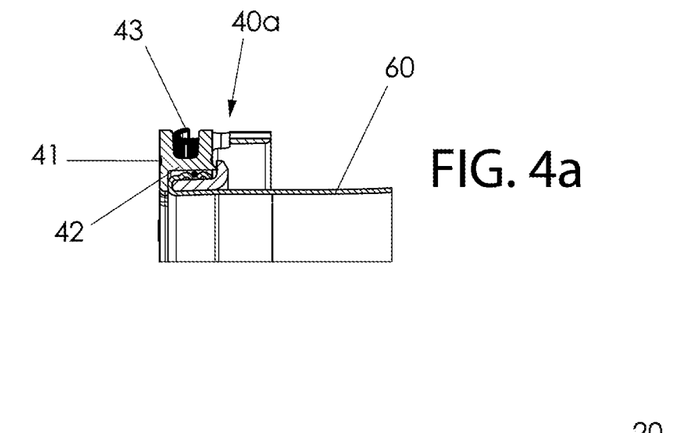
FIG. 4a shows the glove sleeve alone.

FIG. 4a shows the glove sleeve 40a composed of a glove sleeve body 41 on which a seal 43 is fitted in a groove. A glove 60 is fitted on its glove assembly ring 42b, the assembly is inserted into the glove sleeve body 41 in a sealed manner by pressing and gluing or welding, making it indissociable from the glove assembly ring 42b thus forming the glove sleeve 40.

Figure 4B:
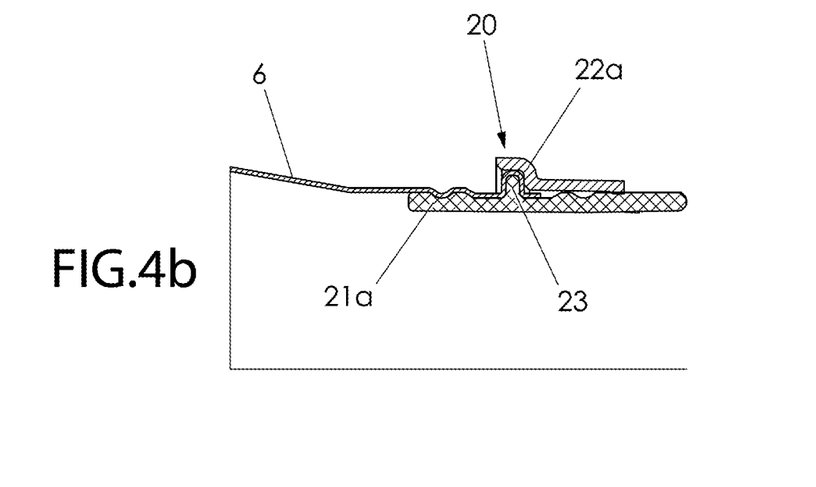
FIG. 4b shows the cuff sleeve alone.

FIG. 4b shows the cuff sleeve 20 composed of a cuff sleeve body 21 on which the cuff 6 is installed above a stop 23, the assembly ring of the cuff sleeve 22 is inserted on the cuff sleeve 21 in exactly the same way as the glove assembly ring 42a.

Figure 4C:
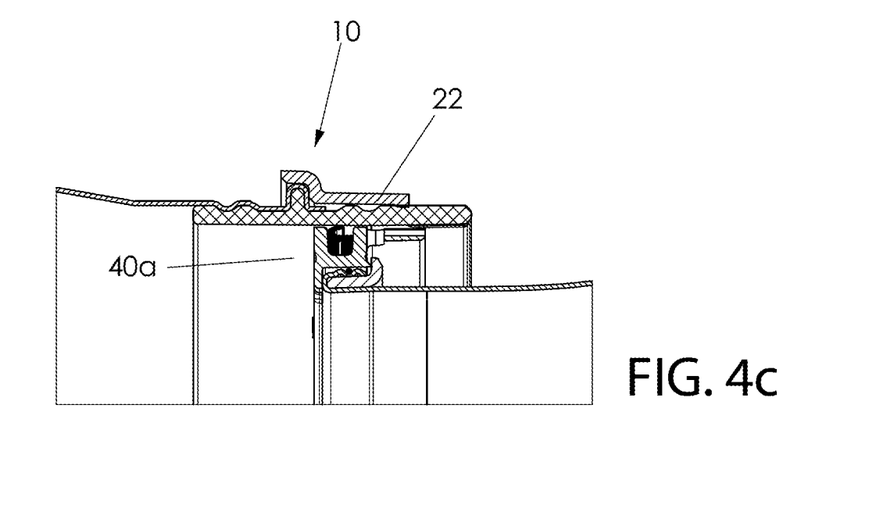
FIG. 4c shows the assembly that becomes the cuff port composed of the glove sleeve installed in the cuff sleeve.

FIG. 4c shows the glove sleeve 40a put into place manually without any special tools into the cuff sleeve 20a thus forming the cuff port 10.

Figure 5:
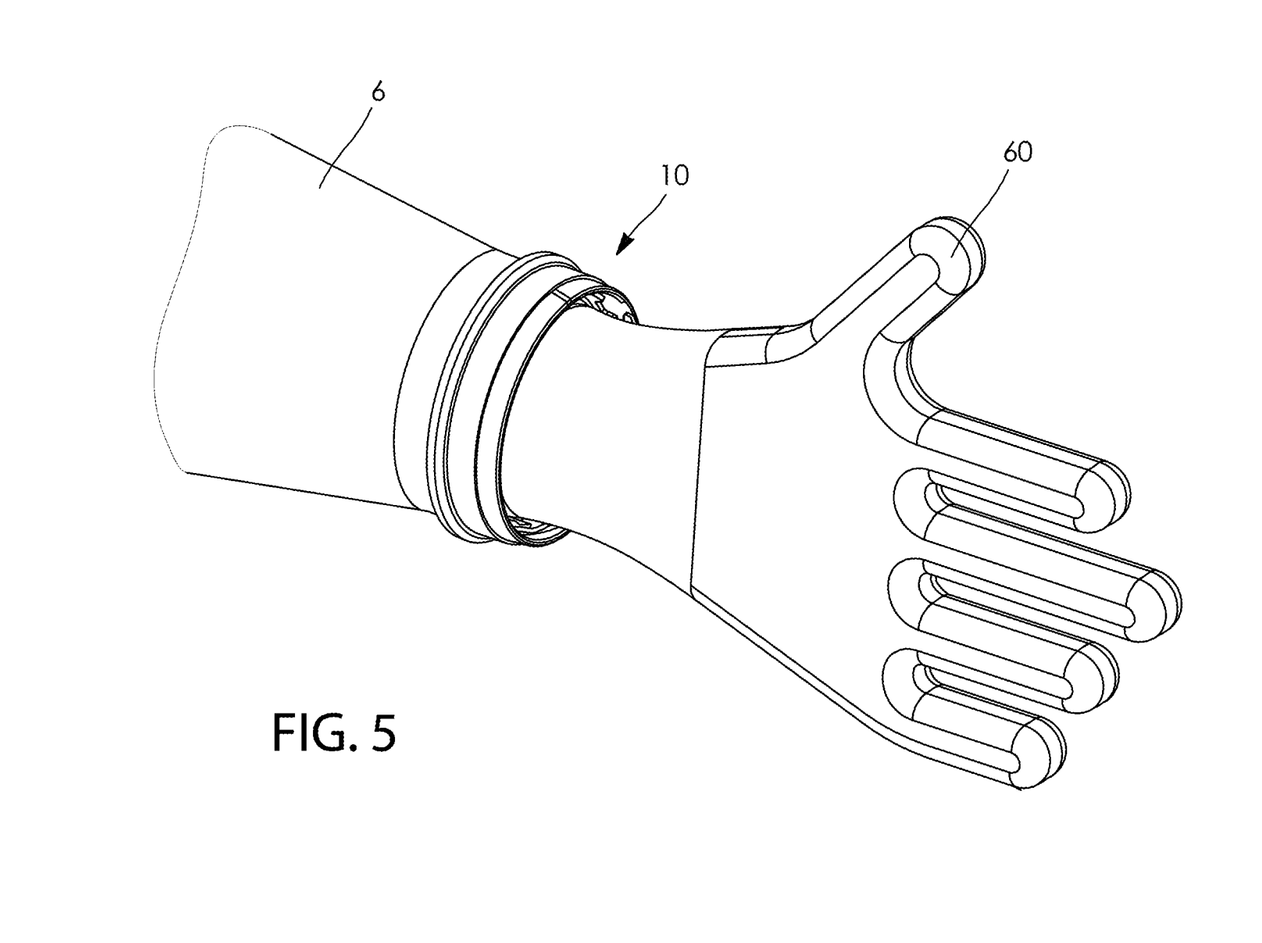
FIG. 5 represents an external view of the assembly comprising the cuff, the cuff port and the glove. It will be seen that the thumb of the glove in the vertical top position is aligned with the mark on the cuff sleeve.

FIG. 5 shows the cuff port cuff 10 and glove 60 assembly installed correctly, with the thumb in the vertical position facing upwards.

Figure 6:
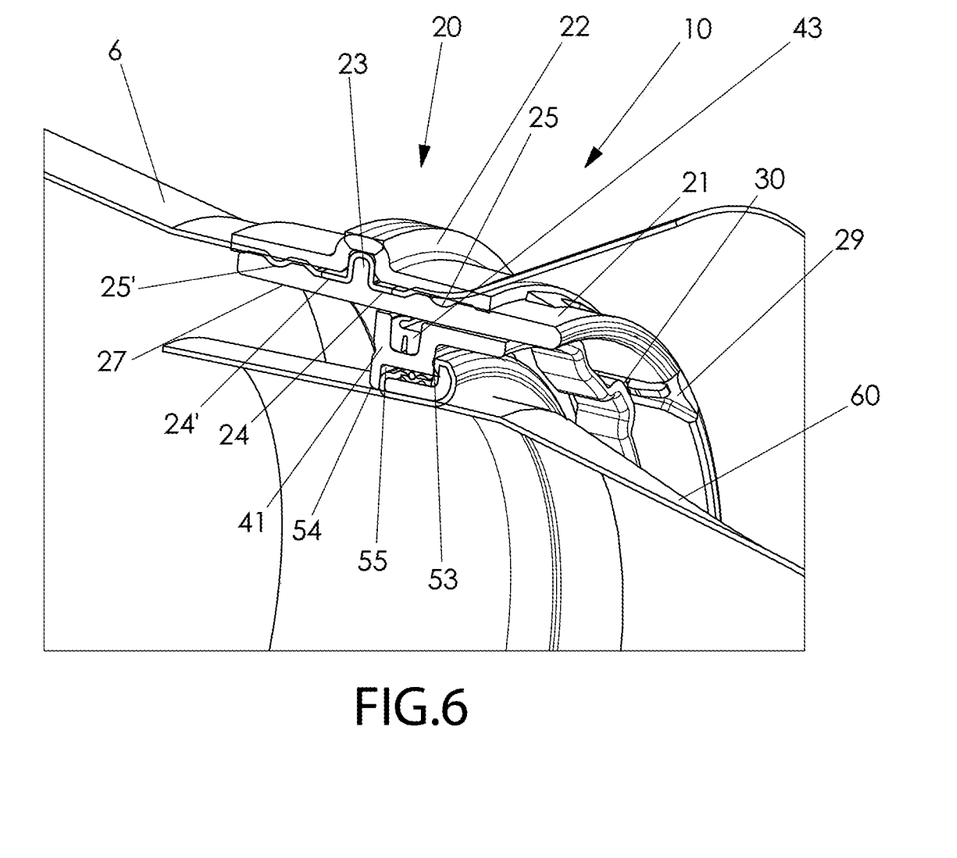
FIG. 6 shows a section through FIG. 5 at a larger scale, on which the composition of the cuff port can be seen in detail, and particularly the seal assuring integrity between the inside of the cuff sleeve and the outside of the glove sleeve.

FIG. 6 is a larger scale view showing details of the cuff port 10 with the cuff sleeve 20 and the glove sleeve 40 and the volume that they create. This volume enables good penetration of gases to fully sterilise this volume. It guarantees good decontamination of exposed surfaces. Depending on operations to be performed, for example in the animal raising business, this volume has to be protected to prevent the introduction of anything that could hinder interchangeability of the system. FIG. 6 helps to get a better understanding of the following figures.

Figure 7:
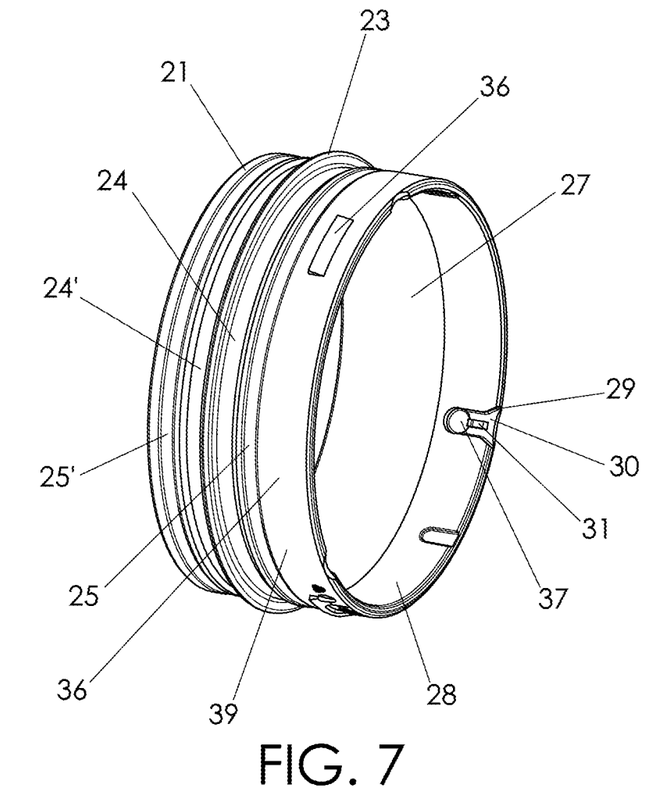
FIG. 7 shows the cuff sleeve body, illustrating the entries and the axial groves in which the snap-fitting and locking studs fit.

FIG. 7 shows the cuff sleeve body 21 alone.

The inside includes a clearance reaming 28 in which there are at least three entrances 29 to ramps 30, preferably at intervals of 120°. These do not open up outside the cuff sleeve body 21. This clearance reaming 28 is slightly larger than the reaming 27 so that the seal is not damaged as it passes through the axial ramps 30 and makes it easier for the operator to introduce the glove sleeve 40. There is a non-return stud 31 with a rectangular shape in the circular direction these axial ramps 30, followed by a cavity 37 terminating the axial ramps 30, so that the snap-fitting studs 49 that fit into the cavities 37 can be snapped into place. The function of the non-return stud 31 is to prevent escape from the groove during the passage in the groove 58. The functions of the visual mark 37 are to keep the glove sleeve body 41 in the locked position on the cuff sleeve body 21 and to create a resonant "click" that the operator hears, to confirm locking. Moreover, one 36 of the visual marks is located on the cuff sleeve body 21, and the other 51 is located on the glove sleeve body 41, confirming this position by being aligned. Therefore the non-return studs 31 act as non-return devices preventing any relative axial and radial movement between the cuff sleeve 20 and the glove sleeve 40.

The operator can use an engagement mark 38 to visually bring the glove sleeve 40 into position on the cuff sleeve 21, facilitating its engagement in the clearance reaming 28. The seal 43 fits into the reaming 27 maintaining dynamic continuity of the seal through the interchangeabiity phase and then a static seal.

The outside of the cuff sleeve body 21 includes a first shoulder on which there are marks 36 and 38, and that comprise a groove 25 after these marks in which a glue deposit can be placed or in which material can be poured in the case of a welded assembly. This is followed by a second groove called the cuff end 24 preventing complex assembly of the cuff 6 on its sleeve body 21. This housing is followed by a shoulder called the sleeve retaining stop 23. Finally, the grooves 24 and 35 are symmetrical behind this stop 23 on the outside of the shell 26, with a cuff end groove 24' and a groove 25' enabling use of the system in the case of a glove box in negative pressure.

Figure 8:
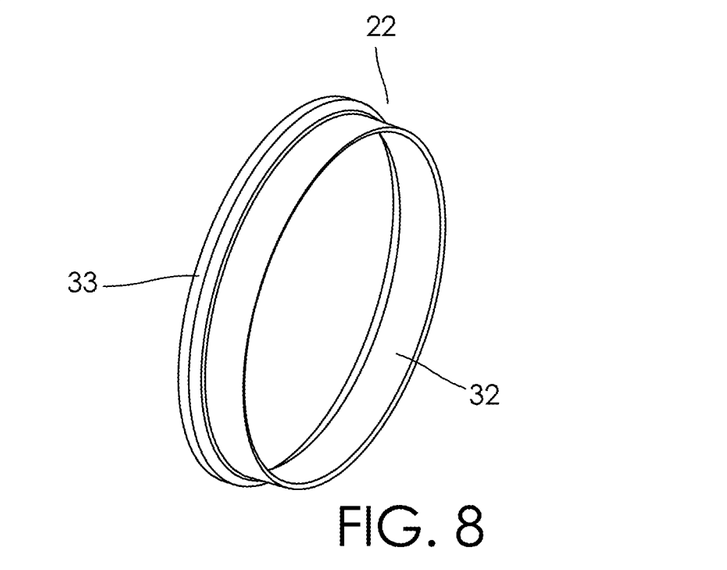
FIG. 8 shows the cuff sleeve assembly ring that is force fitted onto the cuff sleeve body, bearing in contact on the cuff on the shoulder of the cuff sleeve body thus achieving the seal and firmly holding the cuff in position.

FIG. 8 shows the assembly ring of the cuff sleeve 22 on the cuff sleeve body 21 alone, the inner centring reaming 32 centres the cuff sleeve body 21. The shoulder 33 comes into contact with the stop 23 holding the cuff in position by pressure while the glue is setting or during welding. Furthermore, this shoulder 33 has a second very important function of protecting the cuff against shocks, that increases its life.

Figure 9:
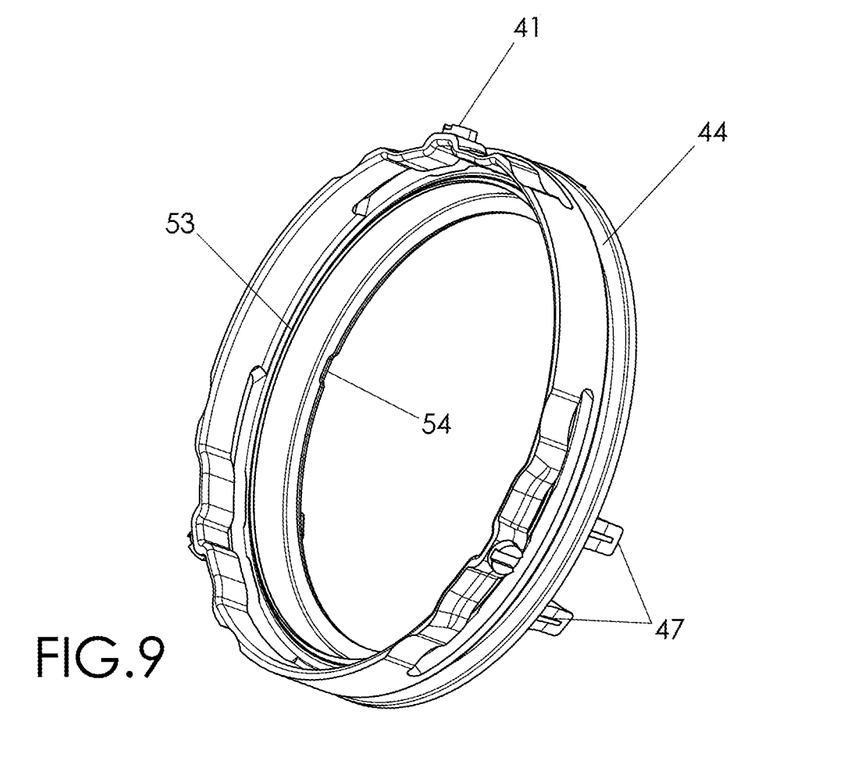
FIGS. 9 and 9a show the glove sleeve body, illustrating the snap-fitting and locking studs, the flexible sectors supporting the snap-fitting and locking studs and the housings holding the retraction pins of these snap-fitting and locking studs during interchangeability and the male and female rotation entrainment notches.

FIG. 9 shows the glove sleeve body 41 alone. This shell-shaped part performs the following functions:

unclip, using the three stud retraction pins 47 located behind the glove sleeve body 41, when they engage in the three pairs of housings 52;

drive the new glove sleeve 41, also located behind the glove sleeve body 41, by the stud retraction pins 47, so as to translate the used glove sleeve 41;

snap fit by three snap-fitting studs 48 located on the tree flexible sectors 48 in front of the glove sleeve body 41;

reception of the stud retraction pins of the new sleeve of the new glove by three housings 52, for which progressive penetration during placement of this new glove sleeve by the operator forces the pins 47 to retract the snap-fitting studs inwards in the radial direction into the glove sleeve body due to deformation of the flexible sectors 48. This flexibility is possible due to the three through slots 50;

seal between the outside of the glove sleeve and the inside of the cuff sleeve body 21. To achieve this, a groove 44 holds the single-lip type seal 43 in the example shown, but it could be an O-ring, double-lip seal, quadrilobe seal, etc. This seal 43 must be composed of a food compatible material, rubber etc. (see FIG. 6). The seal is achieved by compression of the lip of the seal 43 in contact with the smooth internal wall of the reaming 27 of the cuff sleeve body 21. Slip of the elastomer is achieved by surface ionisation that has the advantage of hardening the elastomer on the surface and increasing slip, while reducing the coefficient of friction. Ionisation can be achieved using auto-bactericide silver ions to maintain sterility of the part of the seal 43 in contact with the inside of the cuff sleeve body 21;

visual presentation of the glove sleeve 40 on the cuff sleeve, due to a mark 51 on the outside of the cylindrical part of the sleeve body 41 and on the front edge;

leak tightness of the glove mounted on its assembly ring 42 (see FIG. 10) that bears on the inner shoulder 53 of the glove sleeve body 41;

indissociably retaining the glove to the glove sleeve body 41 and the centring ring 57 of the glove assembly ring 42.

Figure 9A:
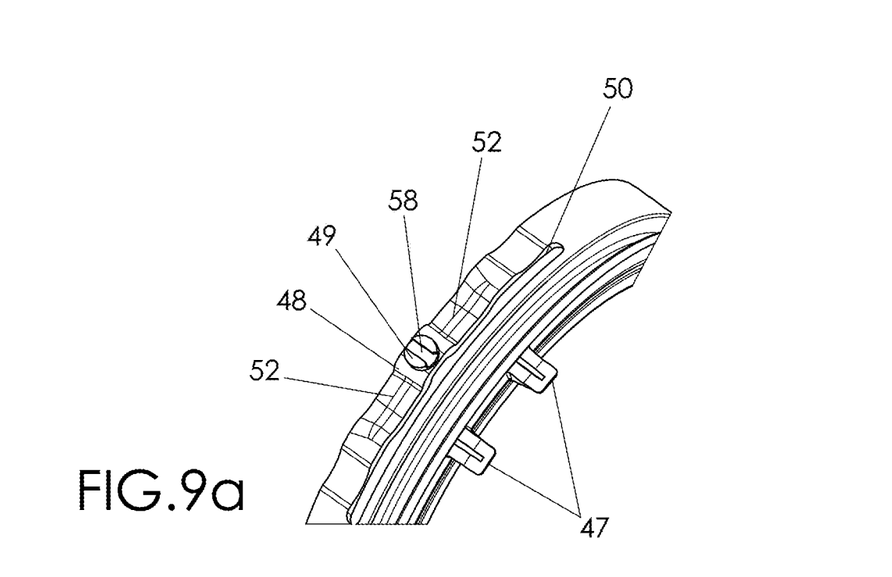

FIG. 9a shows an enlarged detail of a flexible sector 48 with its snap-fitting stud 49, its reception housing 52 for the retraction pins 47, and the groove 47 and the slot 50A, to facilitate understanding.

Figure 10:
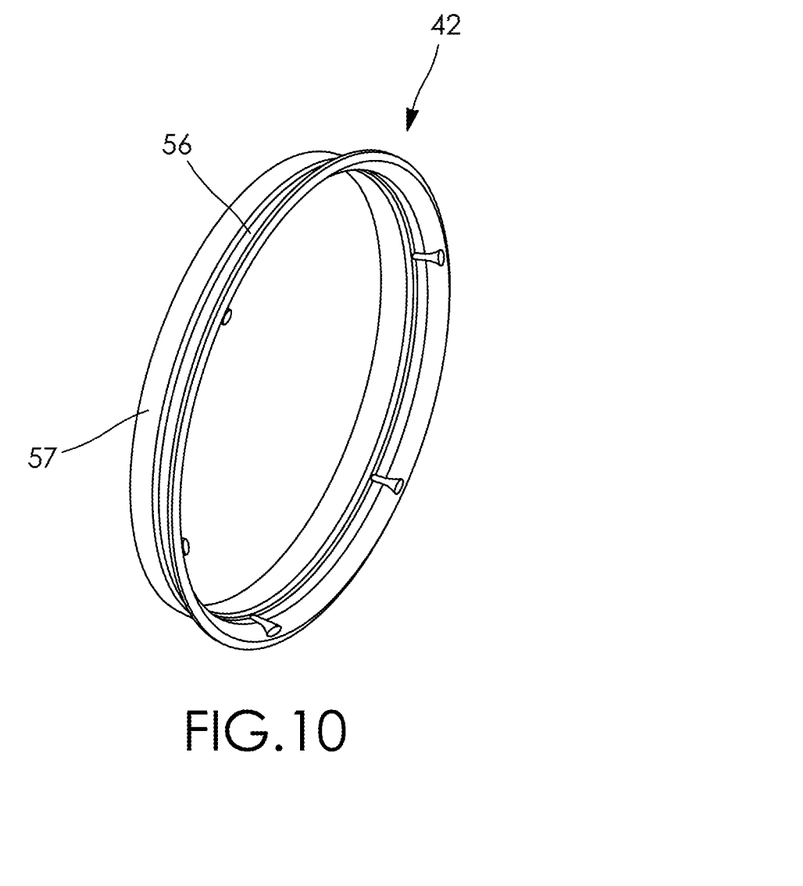
FIG. 10 shows the glove sleeve assembly ring, this rings assembles the glove on the glove sleeve body by ultrasound welding-thus making the seal and firmly retaining the glove.

FIG. 10 shows only the glove assembly ring 42 composed of a collar 56 into which the glove 60 fits and that enables it to bear on the inner shoulder 53 of the glove sleeve body 41. This collar terminates by a centring shell 57 with the inner guide stop 54 of the glove sleeve body 41 (see FIGS. 6 and 9).

One of the main advantages of the invention is placement of the glove that is achieved simply by the operator applying longitudinal pressure. This avoids the need for the operator to make uncomfortable rotation movements, particularly like those necessary with bayonette systems.

PARTS LIST

| Mark | Item |
| --- | --- |
| 2 | Wall (of the confinement containment) |
| 4 | Shoulder port |
| 5 | Collar (holding the cuff on the shoulder port) |
| 6 | Cuff |
| 7 | Interior of the cuff |
| 10 | Cuff port: 10a assembly in positive pressure |
|  | 10b assembly in negative pressure |
| 20 | Cuff sleeve: 20a assembly in positive pressure |
|  | 20b assembly in negative pressure |
| 21 | Cuff sleeve body: 21a assembly in positive pressure |
|  | 21b assembly in negative pressure |

| Mark | Item |
|---|---|
| 22 | Cuff sleeve assembly ring: 22a assembly in positive pressure 22b assembly in negative pressure |
| 23 | Stop (outside of the cuff retention) |
| 24 | Cuff end groove: assembly in positive pressure |
| 24' | Cuff end groove: assembly in negative pressure |
| 25 | Groove: assembly in positive pressure |
| 25' | Groove: assembly in negative pressure |
| 26 | Interchangeability shell |
| 27 | Reaming (of the shell to assure that the seal is maintained when the glove is replaced) |
| 28 | Clearance reaming (protection of the seal) |
| 29 | Entry (engagement of tabs in the axial ramps) |
| 30 | Axial ramps |
| 31 | Non-return stud |
| 32 | Inner reaming (centring of 22 on 21) |
| 33 | Shoulder (holding 6 on 23 by axial pressure and protection of the cuff 6 against shocks) |
| 36 | Visual mark (start and end of locking) |
| 37 | Cavity (for tabs after snap-fitting) |
| 38 | Glove sleeve engagement mark |
| 40a, 40b | Glove sleeve: 40a for assembly in positive pressure 40b for assembly in negative pressure |
| 41a, 41b | Glove sleeve body: 41a for assembly in positive pressure 41b for assembly in negative pressure |
| 42a, 42b | Assembly ring (glove): 42a for assembly in positive pressure 42b for assembly in negative pressure |
| 43 | Seal |
| 44 | Groove (for seal) |
| 47 | Stud retraction pin |
| 48 | Flexible sectors supporting snap-fitting studs |
| 49 | Snap-fitting studs |
| 50 | Through slot (that increases the flexibility of flexible sectors) |
| 51 | Mark (visual for alignment with mark 36) |
| 52 | Housing (for retraction pins) |
| 53 | Inner shoulder (glove skin support) |
| 54 | Inner guide stop forming a natural groove 55 between the sleeve body 41 and the glove assembly ring 42 |
| 55 | Space |
| 56 | Glove support collar |
| 57 | Shell (for centring on the glove sleeve body 41) |
| 58 | Groove |
| 60a, 60b | Glove: 60a for assembly in positive pressure 60b for assembly in negative pressure |

What is claimed is:

1. A two-directional device to replace a handling glove from an inside to an outside of a glove box and from the outside to the inside under confinement, said device being designed to replace a used glove by a new glove comprising a cuff connected in a sealed manner to a shoulder port mounted in a sealed manner on a wall of a confinement containment and connected in a sealed manner to a cuff sleeve, and a glove made of a flexible material connected in a sealed manner to a glove sleeve, wherein an outside of the glove sleeve comprises a determined number of snap-fitting studs located on flexible sectors, and wherein the cuff sleeve has a cylindrical internal surface without any obstacles and comprises a number of axial ramps on the cylindrical internal surface, equal to the number of snap-fitting studs, and configured to guide the snap-fitting studs into anchor cavities thereby locking the glove sleeve in the cuff sleeve, said glove sleeve and said cuff sleeve forming a fully sealed assembly called a cuff port once assembled.

2. The glove replacement device according to claim 1, wherein a static and dynamic seal during the replacement is composed of at least one seal, either injected or embedded in a sealed manner in a groove of the glove sleeve provided on a glove sleeve body/to provide a permanent seal between the cuff sleeve and the glove sleeve.

3. The glove replacement device according to claim 2, wherein the seal is made of elastomer on which surface ionisation has been done to improve its slip properties, facilitating placement of a new ring and ejection of an old ring.

4. The glove replacement device according to claim 1, further comprising stud retraction pins, wherein the snap-fitting studs and the stud retraction pins are provided with visual marks that facilitate correct positional alignment of the glove.

5. The glove replacement device according to claim 1, wherein visual marks are used to facilitate positioning during interchangeability actions consisting of a simple translation, so that no special tools are necessary for the interchangeability manipulation made by the operator.

6. The glove replacement device according to claim 1, further comprising a locking system composed of the snap-fitting studs being insertable into appropriate anchor cavities, these snap-fitting studs being unclipped by retraction pins that enter housings of the flexible sectors to retract towards the inside of the glove sleeve, this action resulting in unclipping of these snap-fitting studs.

7. The glove replacement device according to claim 1, wherein the glove sleeve is composed of a glove sleeve body comprising devices for guidance and locking of this glove sleeve body in a cuff sleeve body and wherein it comprises a glove assembly ring of the glove in the glove sleeve body, retention being obtained by the glove assembly ring in the glove sleeve body.

8. The glove replacement device according to claim 1, wherein the cuff sleeve is composed of a cuff sleeve body and a cuff assembly ring that pushes the cuff into contact with a stop of the cuff sleeve body, thus providing a seal of the cuff sleeve, the complete assembly being retained by assembling the parts making them indissociable.

9. A method of replacing a used glove by a new glove using a device according to claim 5, including the following steps:
the new glove sleeve is placed on the used glove sleeve in position in a cuff sleeve body taking care to align a mark of the new sleeve with a mark of the cuff sleeve body,
the new glove sleeve is pushed onto the used glove sleeve, and
the new glove sleeve and the used glove sleeve are pushed in a single piece into the cuff sleeve body, to the end of locking located on the cuff sleeve body, signalled by a "click".

10. The method according to claim 9, applied to a glove box in positive pressure, wherein it begins with the following two phases:
the used glove is rolled up towards an outside of the cuff, and
the new glove fitted with its sleeve is placed inside the confinement containment.

11. The method according to claim 9, applied to a glove box in positive pressure, wherein at the end of the process, the used glove sleeve is pushed clear into the inside of the cuff.

12. The method according to claim 9, applied to a glove box in negative pressure, wherein it begins with the following three phases:
the cuff is rolled up towards an outside of a cell, and
the new glove is rolled up towards an inside of its own sleeve,
the new glove fitted with its glove sleeve is placed outside the confinement containment.

13. The method according to claim 9, applied to a glove box in negative pressure, wherein at the end of the process, the used glove sleeve is pushed clear into the inside of the glove box.

* * * * *